United States Patent [19]
Shahar

[11] Patent Number: 5,311,288
[45] Date of Patent: May 10, 1994

[54] METHOD AND APPARATUS FOR DETECTING SURFACE DEVIATIONS FROM A REFERENCE PLANE

[75] Inventor: Arie Shahar, Moshav Magshimim, Israel

[73] Assignee: Opal Technologies Ltd., Nes Ziona, Israel

[21] Appl. No.: 909,340

[22] Filed: Jul. 6, 1992

[51] Int. Cl.$^5$ .............. G01B 11/00; G01B 11/14; G01C 3/08; G01C 5/00

[52] U.S. Cl. .................. 356/375; 356/371; 356/373; 356/376; 356/399; 356/400; 356/1; 356/4; 250/201.3; 250/201.5; 250/561

[58] Field of Search .............. 250/201.3, 201.5, 561; 356/373, 375, 399, 400, 371, 376, 1, 4

[56] References Cited

U.S. PATENT DOCUMENTS

| | | |
|---|---|---|
| 3,734,626 | 5/1973 | Roberts et al. .............. 356/371 |
| 4,477,185 | 10/1984 | Berger et al. .............. 250/561 |
| 4,502,785 | 3/1985 | Truax .............. 356/376 |
| 5,076,693 | 12/1991 | Teramoto .............. 356/371 |

*Primary Examiner*—Robert J. Warden
*Assistant Examiner*—L. M. Crawford
*Attorney, Agent, or Firm*—Benjamin J. Barish

[57] ABSTRACT

A method and apparatus for detecting deviation of an examined surface from a reference plane, by: generating first and second beams of radiation, directing the first beam along a first fixed path and focussing it at a first spot on the examined surface, directing the second beam along a second fixed path intersecting the first path at a point in the reference plane and focussing the second beam to a second spot on the examined surface, and detecting the deviation of the centers of the first and second spots with respect to the intersection point in the reference plane to provide an indication of the deviation of the examined surface from the reference plane.

20 Claims, 4 Drawing Sheets

METHOD AND APPARATUS FOR DETECTING SURFACE DEVIATIONS FROM A REFERENCE PLANE

FIELD AND BACKGROUND OF THE INVENTION

The present invention relates to a method and apparatus for detecting surface deviations from a reference plane. The invention is particularly useful in applications involving detecting such deviaions while examining a mask pattern on a semiconductor substrate, and is therefore described below with respect to such an application, but it will be appreciated that the invention could advantageously be used in many other applications as well.

Scanning electron microscopes are commonly used for the accurate indication of critical dimensions of patterns on silicone wafers for the production of integrated circuits. These indications are done when the patterns are at the focal plane of the microscope objective. Any deviation of the pattern from the focal plane affects the indications and therefore must be detected so that the lens or the pattern position can be properly readjusted.

A number of optical systems are known for determining such deviations of the pattern from the focal plane of the microscope objective. Examples of known techniques are described in an article published by H. D. Wolpert, Photonics Spectra June 1987, pp 165-168 and in U.S. Pat. No. 3,264,935. Such systems are generally based on focussing a beam of radiation (e.g., a laser beam) on the examined surface and reflecting the beam to a position-sensitive detector such that any deviation in the examined surface from the focal plane of the microscope objective produces a non-symmetry in the light spot projected on the detector with respect to a reference point on the detector.

However, such a method is sensitive to differences in reflection of the substrate. This greatly limits its use when employed for imaging a masked pattern on a semiconductor substrate for the manufacture of integrated circuits. However, patterned surfaces produce significant and non-uniform scattering, and defraction, and non-uniform reflection. This results in an error, known as a drawback, in the position indication. The drawback is not constant and depends on the random geometrical and optical structure of the pattern on the examined reflecting surface.

U.S. Pat. No. 4,356,392 discloses one system for reducing this drawback. According to the system described in that patent, an auxiliary beam is focussed along a first path to a spot on the examined surface, and is reflected back along a second path to a second spot at the location of the first spot on the examined surface. The second path includes a retro-reflector which inverts the beam directed back along the second path, such that after the double reflection to the examined surface, the two halves of the beam tend to cancel out local differences in reflection.

However, such a system suffers from the following disadvantages: (1) Since the beam used for detecting the deviation in the examined surface from a reference plane is reflected from the examined surface twice, the scattering and/or the absorption at the examined surface substantially attenuates the beam intensity, and thereby decreases the collection efficiency; the system therefore requires the use of a position sensitive detector having a very wide dynamical range, which is not attainable in some situations with the present technology.

(2) In addition, the optical beam undergoing the second reflection is not completely symmetrical with the optical beam undergoing the first reflection because of significant distortions at the time of and following the first reflection; and this non-symmetry between the beams undergoing the two reflections can result in significant positional errors.

It would therefore be highly desirable to provide a method and apparatus for detecting the deviation of an examining surface from a reference plane, in which the above-described drawbacks are reduced or eliminated. It would be particularly desirable to provide such a method and apparatus which could be used in examining patterned surfaces of semiconductor substrates for the manufacture of integrated circuits.

BRIEF SUMMARY OF THE INVENTION

According to the present invention, there is provided a method of measuring deviation of an examined surface from a reference pane, comprising: generating first and second beams of radiation; directing the first beam along a first fixed path and focussing the first beam at a first spot on the examined surface; directing the second beam along a second fixed path intersecting the first path at a point in the reference plane and focussing the second beam to a second spot on the examined surface; and detecting the deviation of the centers of the first and second spots with respect to the intersection point in the reference plane to provide an indication of the deviation of the examined surface from the reference plane.

The invention thus exploits a technique used in World War II for computing the height of an aircraft above a target, by directing two light beams from different known locations on the aircraft to intersect at the target. Since the distance between the locations of the two lights sources was known, and since the angle of the light beams towards the target was also known, a computation could be made by triangulation as to the height of the aircraft above the target. In that known method, the angles of the light beams were varied to cause them to intersect at the target in order to determine the height of the aircraft above the target. In the method of the present invention, however, the angles of the two light beams are fixed so as to intersect at the reference plane; moreover, the deviations of the centers of the spots produced by the two light beams is detected in order to detect the deviation of the examined surface from a reference plane.

According to further features in the described embodiments, the first and second paths have axes which are in the same plane, which plane is perpendicular to the reference plane; in addition, the first spot is imaged on the common detector via a path which includes the second path, and the second spot is imaged on the common detector via a path which includes the first path.

The invention also provides apparatus for detecting deviation of an examined surface from a reference plane in accordance with the above method.

Further features of the invention, and its advantages, will be apparent from the description below.

BRIEF DESCRIPTION OF THE DRAWINGS

The invention is herein described, by way of example only, with reference to the accompanying drawings, wherein.

PRIOR ART

Figure 1:
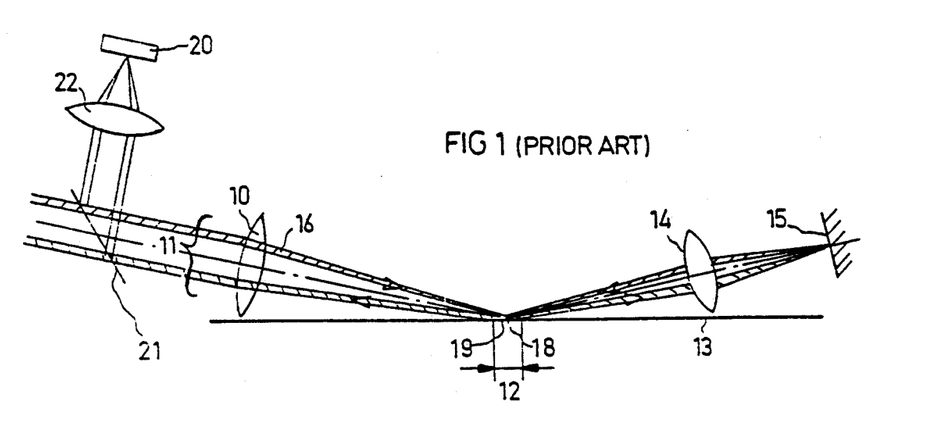
FIG. 1 diagrammatically illustrates a prior art system for detecting the deviation of an examined surface from a reference plane.

The known apparatus as illustrated in FIG. 1 will first be described to aid in understanding the method and apparatus of the present invention as illustrated in FIGS. 2-8.

The known apparatus as illustrated in FIG. 1 includes a first lens system 10 for focussing a narrow auxiliary beam 11 to a small radiation spot 12 on the examined surface 13. The system further includes a second lens system 14 for imaging the radiation spot on a retro-reflector 15 so that the beam is reflected back along its original path and is focussed by lens system 14 at the same radiation spot 12.

FIG. 1 illustrates a portion 16 at one side of the original beam 11 shaded to trace its path. The arrows included in the diagram of FIG. 1 trace the path of shaded portion 16 of the beam. It will be appreciated that the same thing happens with respect to the opposite side of the original beam 11.

Thus, as shown in FIG. 1, shaded portion 16 of the original beam 11 is focussed by the lens system 10 onto spot 12 of the examined surface 13 so that this portion occupies the right-hand side 18 of the focussed spot 12. However, after beam 11 is reflected by the examined surface 13 and by reflector 15, and is refocussed by lens system 14 to spot 12 on the examined surface 13, the shaded portion 16 of that beam occupies the left-hand side 19 of spot 12. The same applies to the portion at the opposite side of the original beam 11. As a result, the intensity of both beam halves of spot 12 on examined surface 13 is influenced to the same extent by any local difference in reflection in the examined surface 13, so that local differences in reflection are substantially cancelled.

The light spot 12 on the examined surface 13, including the two halves 18 and 19, is then focussed on a position detector 20 via a beam splitter 21 and a lens system 22. Further details of the construction and operation of the prior art system as illustrated in FIG. 1 may be had by reference to the above-cited U.S. cited Pat. No. 4,356,392.

However, such a position detecting system suffers from the decrease in collection efficiency, and the non-symmetry betwween the beams of the multiple reflections, as described above. These drawbacks are particularly significant when the system is used for examining patterned surfaces of semiconductor subtrates for the manufacture of integrated circuits.

DESCRIPTION OF PREFERRED EMBODIMENTS

Figure 2:
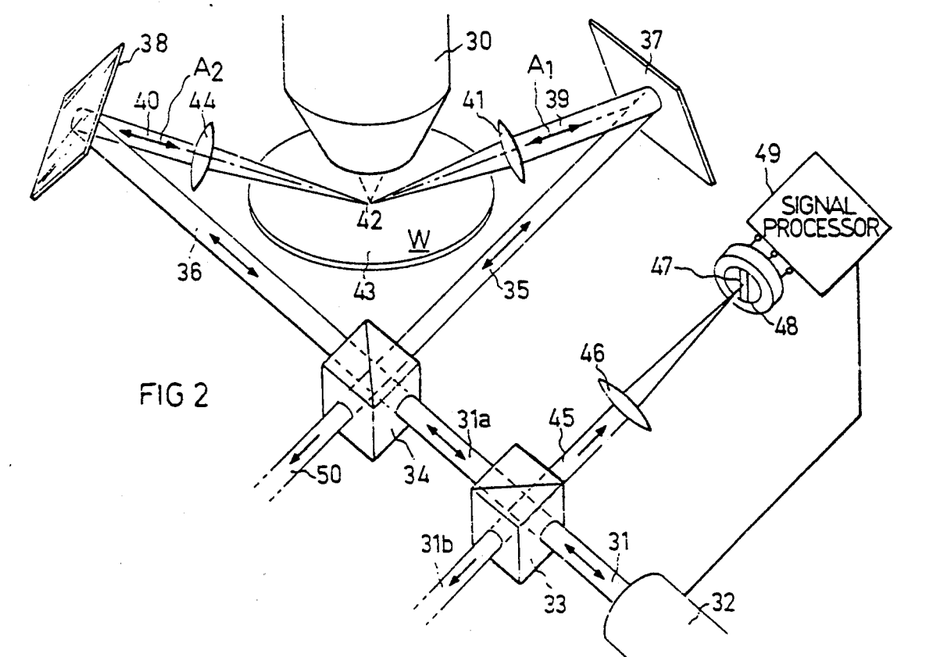
FIGS. 2 and 3 are diagrammatic views illustrating two such systems constructed in accordance with the present invention.

The System of FIG. 2

FIG. 2 illustrates one detection system in accordance with the present invention used with a scanning electron microscope 30 for examining the surface of a semiconductor wafer W. As shown in FIG. 2, a parallel beam 31 is emitted from a light source 32 and propagates through a beam splitter 33. A part 31a of beam 31 is transmitted to a second beam splitter 34, whereas another part 31b is lost by reflection out of the system.

The transmitted part 31a of beam 31 is split by beam splitter 34 into two beams 35, 36, having exactly the same shape, size and intensity. Beams 35 and 36 are reflected, from mirrors 37 and 38, respectively, in the form of beams 39 and 40 to the examined surface of the wafer W. Thus, beam 39 is focussed by lens 41 to a spot 42 on the examined surface 43 of wafer W; and similarly beam 40 is focussed by lens 44 to the exact same spot 42. Spot 42 lies in the focal plane of the objective lens in the standing electron microscope 30.

The focussed beams 39, 40 reflected from the wafer W propagate in the opposite direction along the incoming optical paths of these two beams back to beam splitter 34, and from there back to beam splitter 33. Thus, the orignal incident beam 39 from spot 42 follows the optical path of elements 44, 38, 34 and 33; whereas the original incident beam 40 from spot 42 follows the optical path of elements 41, 37, 34 and 33.

The focussed spots 42 produced by the two beams 39 and 40 are superimposed on each other in beam splitter 34 and are transmitted as one combined, parallel and symmetric beam to beam splitter 33. From beam splitter 33, the combined beam, shown at 45, is focussed by lens 46 to a spot in the position detector 48. The combined image 47 is thus symmetric with respect to the optical axis of lens 46 and consists of two images of spot 42 (on examined surfaces 43) which are symmetric to each other. Since the two images of the exact same spot 42 are superimposed symmetrically on each other in the position detector 48, they always produce the combined image 47 with a shape and intensity distribution which are symmetric with respect to the optical axis of lens 46. This is true even when the images of spot 42 making up image 47 are not symmetric (due to non-uniform optical properties of the examined surface in the area of spot 42). The above-described drawbacks are thus reduced or eliminated.

In this system, a part of the beam received by beam splitter 34 from the examined surface 43 is lost, as shown at 50.

The output of detector 48 is fed to a signal processor, shown schematically by block 49, which analyes the detector output in order to determine the deviation, if any, of the centers of the two spots produced by the two beams 35, 36 on the examined surface of 43 with respect to said intersection point in the reference plane. Examples of how this determination may be made are described below. The signal processor 49 may also include normalizing means, as also to be described below, for controlling the laser 32 to produce a constant intensity output, and thereby to minimize the affects of the output signal by differences in intensity of the image 47 on the detector plane 48.

It will thus be seen that beam splitter 34 and reflector 37 direct one beam (35) along a first path, defined by the axis $A_1$ of lens 41, towards spot 42 on the examined surface 43 of wafer W; whereas beam splitter 34 and reflector 38 direct the second beam 36 along a second path, defined by the optical axis $A_2$ of lens 44, to spot 42 of the examined surface. Lenses 41 and 44 are identical. Their optical axes $A_1$, $A_2$ lie in the same plane and intersect in the geometrical center of the reference plane, namely spot 42 of the examined wafer surface 43 if that surface is exactly in the focal plane of the scanning electron microscope 30. It will also be seen that axes $A_1$, $A_2$ form the same angle with respect to the reference plane, and lie in the same plane which is perpendicular to the reference plane.

Lenses 41 and 44 serve two functions: first, each serves as a projection lens to focus the respective beam 39, 40, to spot 42 of the examining surface; and secondly, each serves as an objective lens which converts the respective incoming beam reflected from spot 42 into a parallel outgoing beam to thereby superimpose the images produced by the two beams 39, 40 in the beam splitter 34. As long as lens 41 and its mirror 37 are identical to lens 44 and its mirror 38, respectively, the effects produced by non-uniform scattering, tilting, and aberations in the optical elements, tend to cancel out, thereby reducing positional errors present in the prior known systems, particularly in systems including a single, multiple-reflected beam as described above with respect to FIG. 1.

Thus, the position detector illustrated in FIG. 2 indicates the measured position as the intersection point between the optical axis of lens 46 and the detector plane 48. This indication of the position of the examined surface with respect to the reference plane is unaffected by the surface patterns on the examined surface. Since the radiation spot 42 is located within the range of the depth of focus of both lens 41 and 44, the indication of the position on detector plane 48 is unaffected by tilting of the surface of the wafer W.

The images 47 on the position detector 48 of the radiation spot 42 on the examined surface wafer 43 are magnified by the factor M as follows:

$$M = f46/f41 = f46/f44$$

where: f41 and f44 are the focal lenths of the lenses 41, 44, respective, and are equal to each other; and f46 is the focal length of lens 46.

The main radiation loss of the optical components in the detection system is due to low collection of radiation from the measured surface, and the transmission and reflection of radiation out of the system by the beam splitters 34 and 33. The amplitude collection efficiency is equal to:

$$2 \cdot T34 \cdot R34 \cdot T33 \cdot R33 \cdot R42$$

where: T33, T44 are the amplitude transmissions of the beam splitters 33, 34; R33, R34 are their amplitude reflectivities, respectively; and R42 is the total collection efficiency of radiation at the position detector plane 48 collected from the measured surface over the area of the radiation spot 42.

Amplitude reflectivity R42 depends on the optical properties of the measured surface, such as reflection, absorption, scattering and diffractions; it also depends on the collection solid angle of the objective lenses 41 and 44. The mathematical expression for R42 is given by:

$$R42 = 1/I \, [\int I(x,y) \, A(x,y) \, dx \, dy + \int I(x',y') \, A(x',y') \, dx'dy']$$

where:

(x,y) are the coordinates of a point located inside the area of the radiation spot on the reference plane;

(x',y') are the coordinates of a point which is symmetric to point (x,y) with respect to the intersection point in the reference plane;

I is the total radiation amplitude of the incoming beam;

$I(x,y) = I(x',y')$ are the local radiation amplitudes of the incoming beam at the points (x,y) and (x',y'), respectively; and A(x,y) and A(x'y') are the collection efficiencies of radiation per unit area which is reflected from the reference plane at points (x,y) and (x',y'), respectively, and collected by the detector The first integral is over half of the area of the radiation spot 42, and the second integral is over the other half of the radiation spot 42. When using the same symbols, the mathematical expression for R42, according to the prior art system illustrated in FIG. 1 is given by:

$$R42 = 2/I \int I(x,y) \, A(x,y) \, A(x',y') \, dxdy$$

Where the integration is over half of the area of the radiation spot 42. The value of R42 varies in the range between 1 and 0. When using patterned surfaces, the value of R42 usually is very small and is the major cause for low radiation collection-efficiency in both types of systems.

The variations in the values of the amplitude reflectivity R42 determine the dynamic range of the position detector. To demonstrate the difference between the dynamic range required from the position detector in the system of FIG. 2, and one according to the prior art single beam multiple-reflection system illustrated in FIG. 1, two simple types of examined surface 43 will be discussed:

1) a mirror-like surface, i.e., A(x,y) approaching 1 and A(x',y') also approaching 1; and 2) an examined surface wherein the illuminated spot area 42 is divided into two halves; one is a mirror-like surface, and the other is one having very low reflectivity; i.e., A(x,y) approaches 1, and A(x',y') approaches 0.

The necessary dynamic range of the position detector for these two situations is 2 for the FIG. 2 system, and approaches infinity for the FIG. 1 prior art system.

The position sensing detector 48 for the detection system may be a commercially available detector. For example, one and two dimensional position sensitive detectors are manufactured by Hamamatzu, type Nos. S1543 and S1300, respectively. One and two dimensional positiion sensing detectors such as bi-cell and quadrant cells are produced by U.D.T. type PIN-spot/2D and pin-spot/4D, respectively.

To assure that the measurement of the position detector will not be affected by the intensity of the image 47 on the detector plane 48, a normalized signal may be used. The normalization of the signal is done by signal processing circuit 49 for the position sensitive detector. One such processor which is available commercially is supplied by Hamamatzu, type No. C3683-01 and its inputs are fed by the signals of the two outputs of the position detector, V1 and V2. The output signal of the processor is the normalized signal and equals:

$$(V1-V2)/(V1+V2).$$

The use of a position sensitive detector is preferred since it detects every movement of any image 47 in its plane. On the other hand a position sensing detector of the bi-cell type will not detect a movement of image 47 in its plane when the image 47 consists of separated spots distributed apart from the separation line between the cells of the detector, as long as one or more of these spots do not intersect the separation line between the detector cells.

Figure 3:
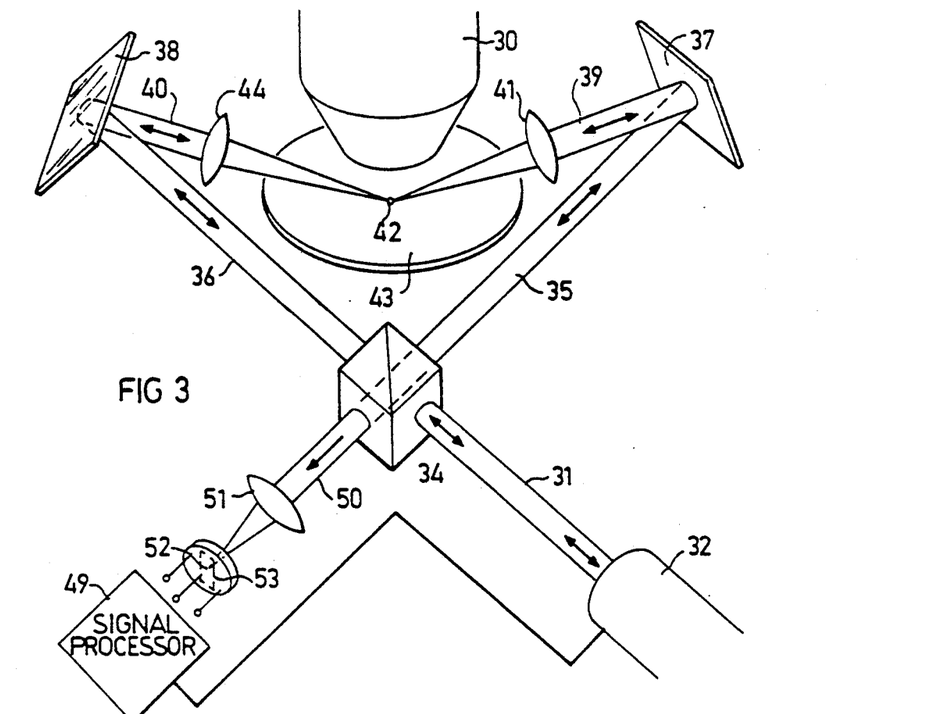
Figure 4:
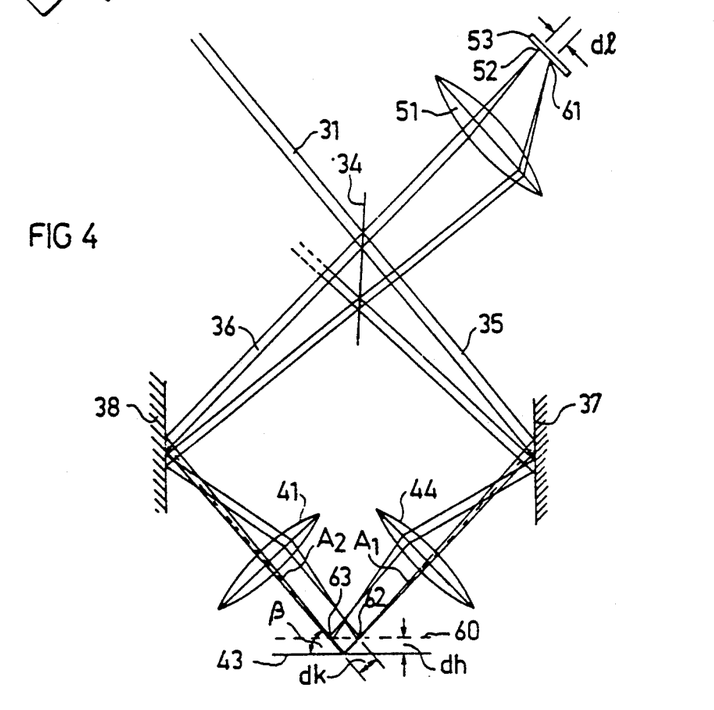
FIG. 4 diagrammatically illustrates the operational principal of the system of FIG. 3.

The System of FIGS. 3 and 4

The system illustrated in FIG. 3 is similar to that of FIG. 2 and operates in substantially the same manner, and therefore the same reference numerals have been used to identify corresponding elements.

In the system of FIG. 3, only a single beam splitter 34 is used, and the portion of the beam 50, which is lost in the system of FIG. 2, is used for detecting the position of the examined surface 43. Thus, portion 50 of the beam leaving beam splitter 34 is focussed by lens 51 to a point 52 on plane 53 of the detector. It will be seen that the image 52 is symmetric with respect to the optical axis of lens 51, and its shape is identical to image 47 of FIG. 2 when lens 51 of FIG. 3 is identical to lens 46 of FIG. 2.

The collection efficiency at the detector plane 53 is the sum of the collection efficiencies for each of the two images of the spot 42 which make up the image 52. It equals $T34^2 \cdot R42$ for one of the images and $R34^2 \cdot R42$ for the other one. The total energy collection efficiency is:

$$(T34^2 \cdot R42)^2 + (R34^2 \cdot R42)^2.$$

This collection efficiency is higher than the one in the detection system illustrated in FIG. 2, since it does not suffer from the loss of the extra beam splitter 33. For proper operation, the two symmetric images of the spot 42 which constitute the image 52 must have the same collection efficiency. In this situation, T34 and R34 (amplitude of transmission and of reflection, respectively, of beam splitter 34) must be equal; i.e., $T34=R34=\frac{1}{2}$. Then the energy collection efficiency is $0.5 \cdot R42^2$ for the detection system of FIG. 3, and $0.5 R42^2 (T33-R33)^2$ for the detection system of FIG. 2.

In spite of the fact the detection system of FIG. 2 has lower collection efficiency compared to the system of FIG. 3, it has a major advantage of having the same collection efficiency for both of the symmetric images of the spot 42 that the image 47 consists of, even when T34 is not equal to R34.

FIG. 4 more particularly illustrates the operation of the system of FIG. 3 in order to detect the deviation of an examined surface 60 from the reference plane 43. The sensitivity of the detection system to deviation of the examined surface 60 from the reference plane 43 is given by the ratio d1/dh, where: dh is the vertical displacement of the examined surface 60 from the reference plane 43; and d1 is the displacement between the center of gravity of the images 52 and 61 on the position detector plane 53 corresponding to the positions of the surfaces 43 and 60, respectively. The angle between the optical axes of lenses 41, 44 and the measured surfaces 60, 43 is $\beta$. The image 61 on the plane 53 consists of the images of the spots 62 and 63 located at a distance dk from the optical axis of lenses 41 and 44, where:

$$dk = [dh \cdot \cos(2\beta - 90)]/\sin\beta = 2 \cdot dh \cdot \cos\beta$$

The displacement d1 equals the magnification $f51/f41 = f51/f44$ times dk where f51 is the focal length of lens 51.

$$d1 = 2 \cdot dh \cdot \cos\beta \cdot f51/f41$$

and the sensitivity d1/dh is:

$$2 \cdot \cos\beta f51/f41$$

This sensitivity is half that in the multiple-reflection prior art system illustrated in FIG. 1. As a practical matter, the sensitivity of concern is the ratio between the change of the opto-electronic signal of the position detector (in mv) and the displacement dh (in $\mu$m). Since the collection efficiency of the detection system illustrated in FIGS. 2 and 3 is much better than in the FIG. 1 prior art system, the overall sensitivity of the system of FIG. 2 or FIG. 3 is better than that of the prior art FIG. 1 system in spite of the lower value of the ratio d1/dh existing in the FIGS. 2 and 3 system.

Figure 5:
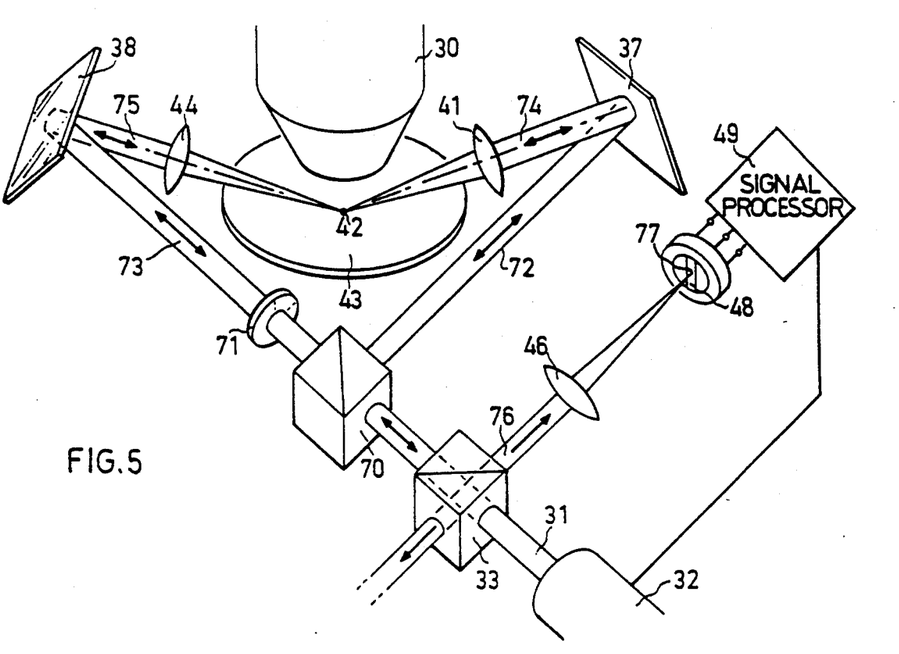
FIGS. 5 and 6 illustrate two systems similar to those of FIGS. 2 and 3, respectively, but including optical polarizing components.

The System of FIG. 5

FIG. 5 illustrates a system similar to that of FIG. 2, and therefore including correspondingly numbered elements, but having modifications for eliminating interference between the beams that form the images of the spot 42 making up image 47 on the detector plane 48. For this purpose, the two beams are polarized in the same orientation before being focussed on the examined surface 43 and are polarized to different orientations after being focussed on the examined surface and before being detected.

Thus, beam splitter 34 (in FIG. 2), which may be a semi-transparent mirror of a semi-transparent cube, is replaced by a polarization splitting cube 70 which causes the two beams outputted therefrom to be circularly polarized 90° to each other. In this case, laser 32 emits a randomly polarized beam 31. The laser may be, for example, a HeNe laser, such as Model No. 3222H-C produced by Hughes. The beam splitter 70 splits the incoming beam into two beams 72, 73, with exactly the same intensity and having polarization orientation normal to each other. In addition, a one-half wave retarder 71 is included in the path of one of the beams, 73, to rotate the polarization orientation of beam 73 by 90°, so as to restore it to the same orientation as beam 72 outputted from the beam splitter 70. Thus, the two beams 74, 75, resulting from the reflection of beams 72, 73 by mirrors 37, 38 towards spot 42 in the examined surface 43, have polarization orientations lying in the same plane so that there is equal reflectivity from spot 42 for the two beams 74, 75. This is important for creating a combined symmetric image 77 on the detector plane 48.

Beam 74 reflected from spot 42 travels, via lens 44 and reflector 38, in parallel to beam 73 travelling in the opposite direction, but is rotated 90° by the wave retarder 71, and therefore arrives at the beam splitter 70 in a polarization orientation suitable for transmission. Beam 75 reflected from spot 42 travels, via lens 41 and mirror 37, in parallel to beam 72 in the opposite direction and also arrives at beam splitter 70 in a polarization orientation suitable for reflection. In such an arrangement, there is no radiation loss at the beam splitter 70.

Since the outgoing beams reflected from beam splitter 33 as one combined beam 76 are polarized with orientation normal to each other, the images of the spot 42 that they form on the detector plane to produce the combined image 77 do not interfere with each other. Accordingly, the sensitivity of the detection system to external vibration is reduced.

Figure 6:
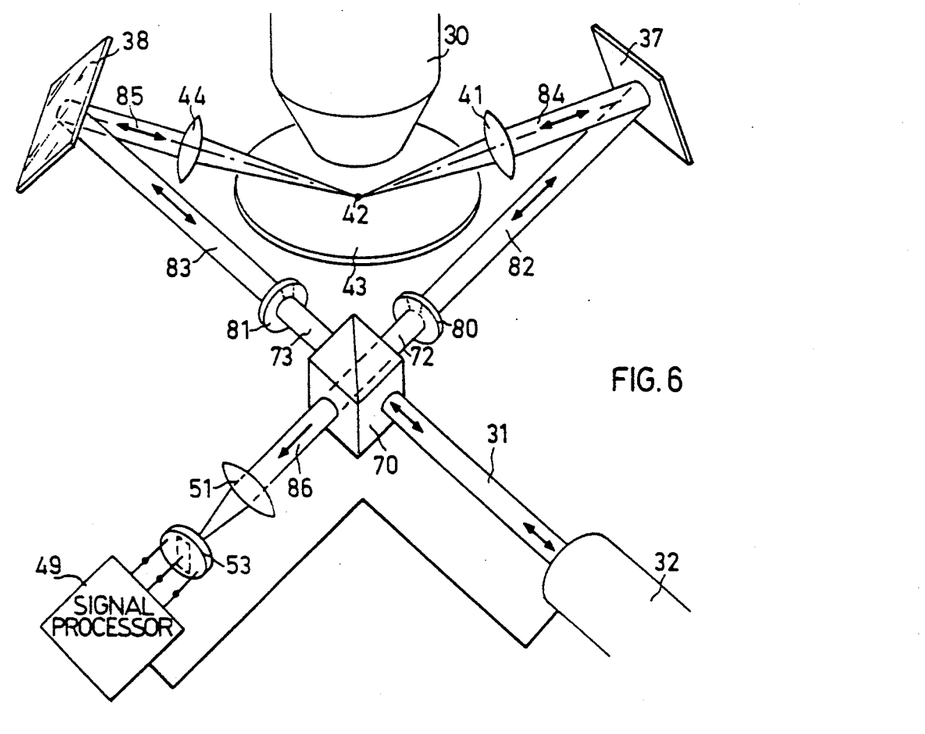

The System of FIG. 6

FIG. 6 illustrates a detection system similar to that of FIG. 3 but also including polarization as in FIG. 5 to prevent interference in the two spots that form the combined image in the detector plane. Thus, in FIG. 6, the randomly polarized beam 31 is split into equal-intensity beams 72 and 73 by beam splitter 70 with polarization orientations that are 90° to each other. A plus one-fourth wave retarder 80 is included in the path of beam 82, and a minus one-fourth wave retarder 81 is included in the path of beam 83. Beams 82 and 83 thus have the same polarization, so that the incoming beams 84, 85 which are focussed on spot 42 of the examined surface 43 assure the same reflection for both from spot 42. The outgoing beams that propagate in parallel in opposite directions to the incoming beams 82 and 83 arrive at the beam splitter 70 after their same polarization has been converted to 90° polarization by the wave retarders 80, 81. The polarization orientations of the outgoing beams received by beam splitter 70 and are thus normal to each other and are therefore combinable by the beam splitter into one combined beam 86 without radiation loss to thereby form the two images of the spot 42 on the common detector 53, via lens 51, without interference between them.

Figure 7:
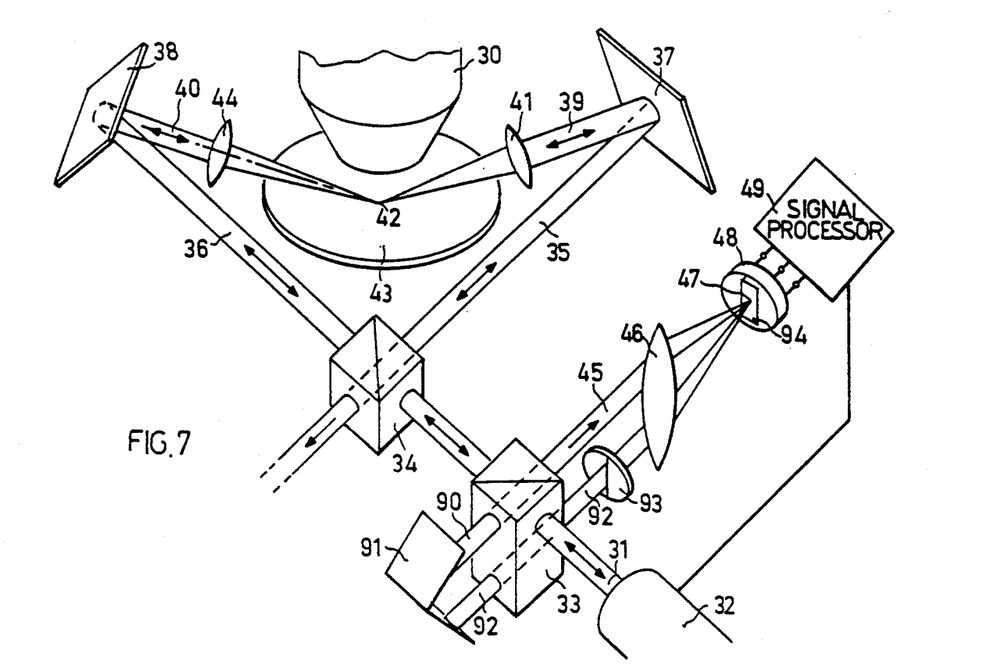
FIG. 7 diagrammatically illustrates a system similar to that of FIG. 2 but including an alignment test unit which shows that the detection system is properly aligned.
Figure 8:
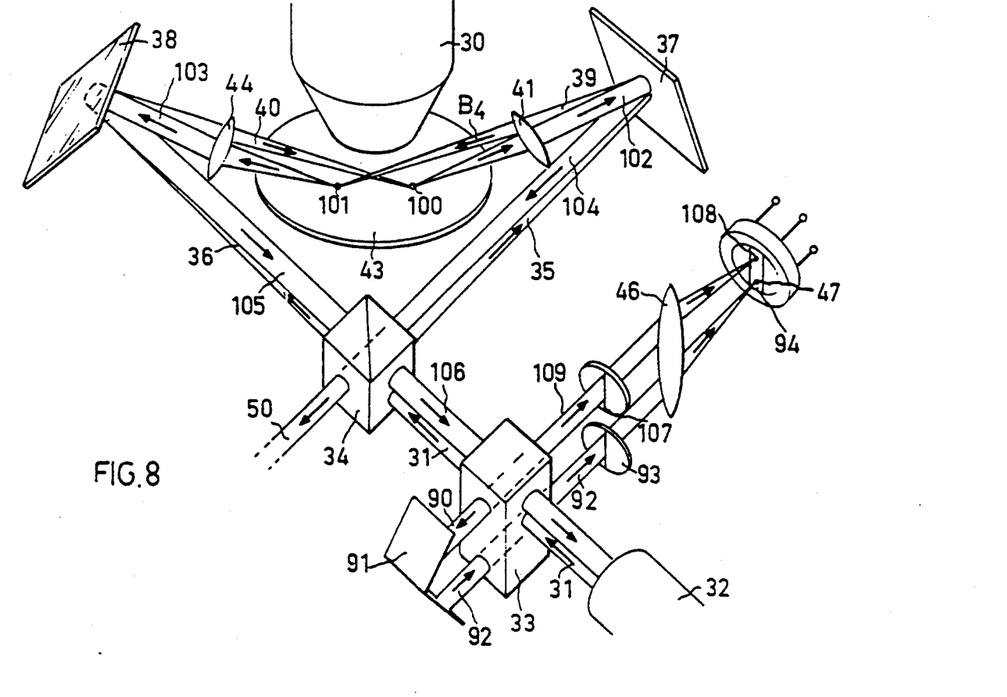
FIG. 8 diagrammatically illustrates the system of FIG. 7 when the detection system is not properly aligned.

The System of FIGS. 7 and 8

FIGS. 7 and 8 illustrate a detection system similar to that of FIG. 2 (and therefore the corresponding elements are correspondingly numbered), combined with an alignment test unit for checking if the detection system is well aligned with the reference plane, namely the focal plane of the scanning electron microscope 30. FIG. 7 illustrates the condition wherein the detection system is well aligned, whereas FIG. 8 illustrates the condition wherein the detection system is mis-aligned and therefore requires alignment.

Thus, the alignment test unit comprises an additional retro-reflector 91, which receives a part of beam 31 from the laser 32; a chopper 93; and a two-dimensional position detector 94, for detecting alignment deviations of the detection system in the two possible vertical orientations.

As shown in FIG. 7, part 90 of the beam 31 from laser 32 is reflected towards the retro-reflector 91 and is reflected back as a beam 92 parallel to beam 90 but vertically displaced with respect to that beam. Beam 92 travels in the opposite direction from beam 90 through the beam splitter 33 and through chopper 93 towards lens 46.

When the detection system is well aligned as shown in FIG. 7, the two outgoing beams from the examined surface 43, as received by beam splitter 33, travel in an optical path that is parallel, but opposite, to incoming beam 31; they are therefore reflected by beam splitter 33 as beam 45, which is parallel to beam 92 from the retro-reflector 91. In this situation, the beams 45 and 92 are focussed to the exact same spot on the detector plane 94. Since the focussed spots of both beams 45 and 92 are symmetric and have a common geometrical center which coincides with their intensity center of gravity, and since a normalized signal (as described above) from the signal processing circuit of the position sensor detector is used, position changes will not be indicated by the detector between the two situations when the chopper allows the beam 92 to pass through it, and when it blocks beam 92 but permits only beam 45 to be focussed on the detector plane.

FIG. 8 illustrates the situation wherein the detection system of FIG. 7 is not well aligned. The misalignment causes the incoming beams 39 and 40 to be focussed by the lenses 41 and 44 into separated spots 100 and 101. Thus, spot 100 focussed by lens 44 is not on the optical axis of lens 41; and similarly spot 101 focussed by lens 41 is not on the optical axis of lens 44. As a result, the reflected beams 39, 40 are converted by the lenses 41, 44 into outgoing beams 102, 103, which are parallel beams but not oriented parallel to beams 39 and 40.

For the same reason, the outgoing beams 104, 105, 106 are parallel beams but are not parallel to the incoming beams 35, 36, 31, respectively; and similarly beam 109 from beam splitter 33 is not parallel to beam 92. In this situation, the image 108 on the detector plane 94 consists of the images of the spots 100, 101 combined symmetrically with each other. Since the spots 100, 101 are not necessarily identical, the image 108 on the detector plane 94 may not be a symmetric image; in addition, its position on the detector plane 94 differs from that of image 47 on the detector plane, which serves as a reference point and which is formed when the detection system is well aligned. Since the position of the image 47 on the detector plane 94 is always identical to the position of the focussed spot of beam 92 on the detector plane 94, any position change detected by the position detector when blocking beam 45 (FIG. 7), beam 109 (FIG. 8), or beam 92 (FIGS. 7 or 8) during the operation of the choppers (93 or 107) indicates misalignment of the optical system.

The position deviation of the image 108 (FIG. 8) from the position of the image 47 has to be analyzed separately for determining vertical and lateral deviations. In a situation where the deviation between the images 108 and 47 is along a vertical direction, the images of the two spots 100 and 101, making up image 108, move together away from image 47 as one combined image 108. In a situation where the deviation between images 108 and 47 is along the lateral direction, the images of the two spots 100 and 101, making up image 108, move separately in opposite directions to the right and to the left; in such case, the image 108 consists of two spots located symmetrically on both sides of image 47.

Because of this behaviour, it will be seen that vertical deviation between the images 108 and 47 will always be detected by the two-dimensional position sensor detector 94 for any type of examined surface used for the alignment test. On the other hand, lateral deviation between the images 47 and 108, which consists of two separate images of spots 100 and 101 located symmetrically on both sides of image 47, can be detected only if the images of the spots 100 and 101, making up image 108, differ from each other. In this case, the measured surface used for the alignment test has to be non-uniform in its optical properties along the lateral direction.

The realignment of the system for eliminating misalignments in the lateral direction can also be done even when the measured surface is a mirror-like surface, by readjusting this system into a position where the images of the spots 100 and 101 on the detector plane overlap to produce a minimum area of the combined image 108. For example, this process can be done by replacing the detector plane 94 with a plane of a CCD matrix camera, and using image processing methods.

The realignment of the detecting system can be done by adjusting its optical components and repositioning the wafer 43 whose surface is to be examined for deviation from the reference plane, e.g., the focal plane of a scanning electron microscope.

While the invention has been described with respect to several preferred embodiments, it will be appreciated that they are set forth purely for purposes of example, and that many other variations, modifications and applications of the invention may be made.

What is claimed is:

1. A method of detecting deviation of an examined surface from a reference plane, comprising:
   generating first and second beams of radiation;
   directing said first beam along a first fixed path and focussing the first beam to a first spot on a surface to be examined;
   directing said second beam along a second fixed path intersecting said first path at a point in said reference plane and focussing said second beam to a second spot on said examined surface;
   and detecting the deviation of the centers of said first and second spots with respect to said intersection point in the reference plane to provide an indication of the deviation of said examined surface from said reference plane.

2. The method according to claim 1, wherein said generated first and second beams are of equal shape, size and intensity, and are at the same angle with respect to the reference plane.

3. The method according to claim 2, wherein:
   said first and second paths have axes which are in the same plane, which plane is perpendicular to the reference plane;
   said first spot is imaged on a common detector via a path which includes said second path;
   and said second spot is imaged on said common detector via a path which includes said first path.

4. The method according to claim 3, wherein said first and second imaged spots are superimposed on each other in beam splitter means which transmits the superimposed spot to said common detector.

5. The method according to claim 4, wherein said beam splitter means also splits a single source beam of radiation into said first and second beams and directs said first and second beams to said first and second paths.

6. The method according to claim 4, wherein said beam splitter means includes:
   a first beam splitter which splits a single source beam into said first and second beams and directs them via said first and second paths to the examined surface; said first beam splitter also superimposing said first and second spots received from said examined surface;
   and a second beam splitter receiving said superimposed spots from said first beam splitter and directing them to said common detector.

7. The method according to claim 4, wherein said beam splitter means includes a single beam splitter which splits a single-source beam into first and second beams and directs them via said first and second paths to the examined surface, superimposes said first and second spots received from said examined surface, and directs said superimposed spots to said common detector.

8. The method according to claim 4, wherein the two beams are polarized to the same orientation before being focussed on said examined surface, and are polarized to different orientations after being focussed on said examined surface and before being detected.

9. The method according to claim 1, wherein said deviation of the centers of said first and second spots is detected by superimposing the two spots on a detector and analyzing the superimposed spot for non-symmetry in intensity with respect to a reference point on the detector corresponding to said intersection point in the reference plane.

10. The method according to claim 1, wherein said deviation of the centers of said first and second spots is measured by:
    superimposing the two spots on a detector;
    projecting on said detector a reference spot at a location corresponding to that when the examined surface is in the reference plane;
    and detecting the spatial deviation between said superimposed spot and said reference spot.

11. Apparatus for detecting the deviation of an examined surface which reflects radiation from a reference plane, comprising:
    beam generating means for generating first and second beams of radiation;
    first beam directing means for directing said first beam along a first fixed path and focussing the first beam to a first spot on a surface to be examined;
    second beam directing means for directing said second beam along a second fixed path intersecting said first path at a point in said reference plane and focussing said second beam to a second spot on said examined surface;
    and detecting means for detecting the deviation of the centers of said first and second spots with respect to said intersection point in the reference plane to provide an indication of the deviation of said examined surface from said reference plane.

12. The apparatus according to claim 11, wherein said beam generating means generates first and second beams of equal shape, size and intensity, and at the same angle with respect to the reference plane.

13. The apparatus according to claim 12, wherein:
    said first and paths have axes which are in the same plane, which perpendicular to the reference plane;
    and said detecting means includes a common detector and imaging means which images said first spot on said common detector via a path which includes said second path, and images said second spot on said common detector via a path which includes said first path.

14. The apparatus according to claim 13, wherein said imaging means further includes beam splitter means on which said first and second spots are superimposed, and which transmits the superimposed spot to said common detector.

15. The apparatus according to claim 14, wherein said generating means includes a laser outputting a laser beam, and said beam splitter means also splits the laser beam into said first and second beams and directs them to said first and second paths.

16. The apparatus according to claim 14, wherein said apparatus includes a laser for outputting a laser beam; and said beam splitter means includes first and second beam splitters;

said first beam splitter splitting the laser beam into said first and second beams and directing them via said first and second paths to the examined surface; said first beam splitter also receiving said first and second spots from said examined surface and superimposing them on each other;

said second beam splitter receiving said superimposed first and second spots from said first beam splitter and directing the superimposed spots to said detector.

17. The apparatus according to claim 14, wherein said beam splitter means includes a single beam splitter which splits a single-source beam into first and second beams and directs them via said first and second paths to the examined surface, superimposes said first and second spots received from said examined surface, and directs said superimposed spots to said common detector.

18. The apparatus according to claim 14, further including:

means for polarizing the two beams to the same orientation before being focussed on said examined surface;

and means for polarizing the two beams to different orientation after being focussed on said examined surface and before being detected.

19. Apparatus according to claim 11, wherein said detecting means includes:

a common detector;

means for detecting the deviation of the centers of said first and second spots by superimposing the two spots on said common detector;

and means for analyzing the superimposed spot for non-symmetry in intensity.

20. The apparatus according to claim 11, wherein said detecting means includes:

a common detector;

means for superimposing the first and second spots on said common detector;

means for projecting on said common detector a reference spot corresponding to the location of the superimposed spot when the examined surface is in the reference plane;

and means for detecting the spatial deviation between said superimposed spot and said reference spot.

* * * * *